US012591458B2

(12) United States Patent
Kandasamy et al.

(10) Patent No.: US 12,591,458 B2
(45) Date of Patent: Mar. 31, 2026

(54) ASSISTANT FOR CLOUD ARCHITECTURES

(71) Applicant: International Business Machines Corporation, Armonk, NY (US)

(72) Inventors: Malarvizhi Kandasamy, Bangalore (IN); Akshay Thyagaraja Kotagal, Bangalore (IN); Srinivasan Nanduri, Bengaluru (IN); Ankita Dutta, Kolkata (IN); Abhineet Karn, Surat (IN); Pavan Kumar Reddy Yannam, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 18/309,904

(22) Filed: May 1, 2023

(65) Prior Publication Data

US 2024/0370298 A1 Nov. 7, 2024

(51) Int. Cl.
*G06F 9/50* (2006.01)

(52) U.S. Cl.
CPC .......... *G06F 9/5011* (2013.01); *G06F 9/5072* (2013.01)

(58) Field of Classification Search
CPC .................................................... G06F 9/5011
See application file for complete search history.

(56) References Cited

U.S. PATENT DOCUMENTS

| 11,206,190 B1 | 12/2021 | Cannon |
| 2019/0349251 A1 | 11/2019 | Weldemariam |
| 2019/0356555 A1 | 11/2019 | Bai |

OTHER PUBLICATIONS

Skanning, et al, How To Create Diagrams in Python with Diagrams Code, 2022 (Year: 2022).*

Cimini, Matteo, "Graph-based real-time recommendation systems", Dec. 9, 2019, 11 pages, <https://medium.com/quantyca/graph-based-real-time-recommendation-systems-8a6b3909b603>.

Claudel, Yann, "Recommendation engine with networkx", Downloaded Feb. 23, 23, 1 page, <https://www.kaggle.com/code/yclaudel/recommendation-engine-with-networkx/notebook>.

Cui et al., "Graph-based recommendation system with Neptune ML: Anillustration on social network link prediction challenges", Jan. 12, 2022, 10 pages, <https://aws.amazon.com/blogs/machine-learning/graph-based-recommendation-system-with-neptune-ml-an-illustration-on-social-network-link-prediction-challenges/>.

Deblois-Beaucage. Jeremi, "Building a Recommender System Using Graph Neural Networks", Mar. 31, 2021, 16 pages, <https://medium.com/decathlontechnology/building-a-recommender-system-using-graph-neural-networks-2ee5fc4e706d>.

Disclosed Anonymously, "Recommendation System for Next Steps when Designing Integrations", An IP.com Prior Art Database Technical Disclosure, IP.com No. IPCOM000268719D, IP.com Electronic Publication Date: Feb. 21, 2022, 4 pages.

(Continued)

*Primary Examiner* — Charlie Sun
(74) *Attorney, Agent, or Firm* — Anthony Curro

(57) ABSTRACT

A processor may receive information associated with resources and edges from Infrastructure as Code (IaC). The processor may assemble a knowledge graph. The knowledge graph may be a controlling root graph for infrastructure code that contains the resources and edges from the IaC. The processor may determine, based on global usage statistics of the resources, probabilities of going from one resource to another resource. Going from one resource to another resource may be an edge. The processor may generate a recommendation for a next response.

17 Claims, 5 Drawing Sheets

(56) References Cited

OTHER PUBLICATIONS

Hu et al., "GNN-based Molecular Graph Autocompletion", DEIM Forum 2021, 8 pages, <https://proceedings-of-deim.github.io/DEIM2021/papers/A13-3.pdf>.

Kuschke et al., "Pattern-based auto-completion of UML Modelling activities", Copyright 2014, 6 pages, <https://www.researchgate.net/publication/266266421_Pattern-based_auto-completion_of_UML_modeling_activities>.

Mazanek et al., "Auto-completion for Diagram Editors based on Graph Grammars",2008 IEEE, 1 page, <https://ieeexplore.ieee.org/document/4639094>.

Sheng, Wayne, "Graph Database for Recommendation Systems", Jun. 27, 2022, 8 pages, <https://www.nebula-graph.io/posts/use-cases-of-graph-databases-in-real-time-recommendation>.

Wu et al., "Graph Neural Networks in Recommender Systems: A Survey", arXiv:2011.02260v4 [cs.IR] Apr. 2, 2022, 37 pages.

* cited by examiner

100

200

300

350

ASSISTANT FOR CLOUD ARCHITECTURES

BACKGROUND

The present disclosure relates generally to the field of the cloud architecture, and more specifically to design assistance for cloud architectures.

Currently, drawing diagrams using diagram editors for cloud architecture is time consuming. Traditionally, a user needs to put more efforts in adding resource in the architecture and in deciding whether a resource comes inside a region, zone, or subnet, and where to place the resource.

Additionally, if a user chooses resources from palettes (e.g., custom or pre-defined resources) and uses their domain knowledge to develop architecture designs, this has a high probability of leading to non-complaint architectures, which the user can later validate and correct the diagram. In order to simplify the process of developing architecture designs and reduce the chances of non-compliant designs, a diagram design assistant which helps the user by recommending compliant options to add for a particular resource is needed. With the help of such a diagram assistant, a user can quickly finish a diagram without wasting time and overthinking much about compliant resource selection or placement.

SUMMARY

Embodiments of the present disclosure include a method, computer program product, and system for a design assistant for cloud architectures. A processor may receive information associated with resources and edges from Infrastructure as Code (IaC). The processor may assemble a knowledge graph. The knowledge graph may be a controlling root graph for infrastructure code that contains the resources and edges from the IaC. The processor may determine, based on global usage statistics of the resources, probabilities of going from one resource to another resource. Going from one resource to another resource may be an edge. The processor may generate a recommendation for a next response.

In some embodiments, determining probabilities of going from one resource to another resource may include the processor analyzing real-time data usage statistics as resources are used, and updating the probability for each resource in real-time.

In some embodiments, determining probabilities of going from one resource to another resource may include the processor weighting the probabilities based on one or more factors. The one or more factors may be associated with a likelihood of a resource being used.

In some embodiments, weighting the probabilities may include the processor forecasting usage statistics for the IaC.

In some embodiments, weighting the probabilities may further include the processor accessing usage statistics of a user, predicting user usage of the resource based on the usage statistics of the user, and generating a user specific weight.

In some embodiments, generating the recommendation may include the processor analyzing ancestor resources as based on the global usage statistics, analyzing the placement of the resources, and analyzing resource attribute information.

In some embodiments, the processor may further update, based on the analyzing of the ancestor resources, placement of the resources, and the resource attribute information, the recommendation in real time.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
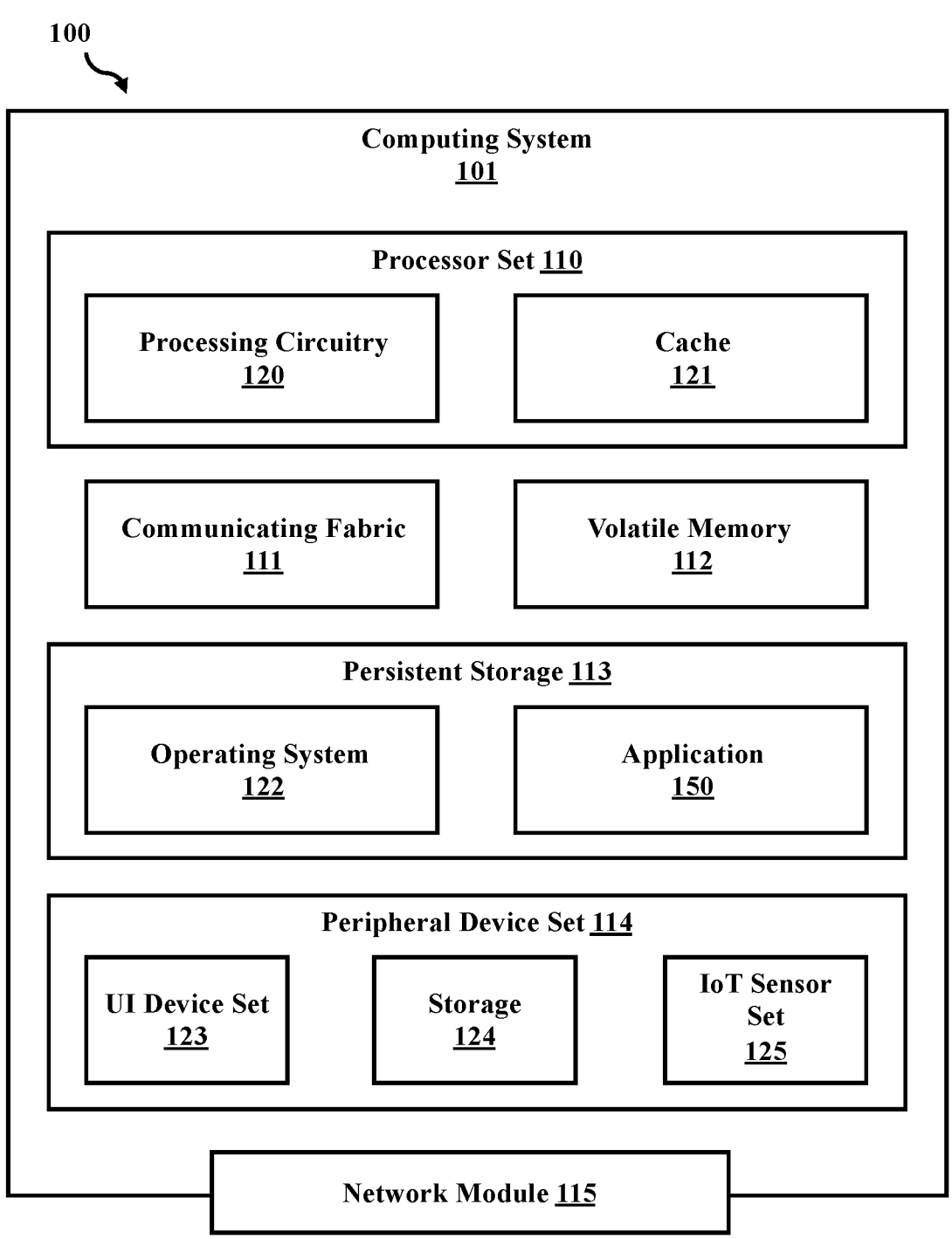
FIG. 1 depicts a block diagram illustrating an embodiment of a computer system and the components thereof, upon which embodiments described herein may be implemented in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of the cloud architecture, and more specifically to design assistance for cloud architectures. While the present disclosure is not necessarily limited to such applications, various aspects of the disclosure may be appreciated through a discussion of various examples using this context.

As will be discussed more fully throughout this disclosure, as a user draws a cloud architecture diagram with their domain knowledge, a design assistant helps the user in presenting their next set of objects along with edges. The assistant further helps them to auto-complete the diagram quickly. The level of next set of objects that can appear in the diagramming tool (e.g., assistant) can further be configured by user. Herein, a trained machine learning model can further help the user design architecture diagrams with ease. The models can make use of a graph based knowledge base to recommend the next steps in the design. The prediction of next set of objects is based on the current object and the placement of the object in current diagram.

The assistant described herein can use a knowledge graph (e.g., a MAGIC graph, or described herein sometimes as a controlling root graph) as the source of truth. In some embodiments, weights are added to the edges of the knowledge graph, which denote the probabilities of choosing that edge. The user can then select a resource from the predicted results, after which the assistant suggests possible next resources to be used to complete the diagram. The diagram can also select the next resource based on the context, and parent information in which the current graph is placed.

The benefit to such solution, or assistant, is that compliant architecture shapes, and objects along with edges are presented to the user, when they are drawing an object; the user just has to just select the suggested object along with edges and add it to their existing diagram. Further, advantageously, the solution assists the user in developing cloud designs, and architectures, without wasting time, which inherently speeds up the development process.

As a more in-depth implementation description of the proposed solution, the assistant described herein may include:

1) A knowledge base, which may be controlling root graph for infrastructure code (e.g., a MAGIC graph) that represents all possible resource and connections between resources. The knowledge base may be built from IaC from all open source code repositories. The knowledge base may further have diagrams designed by the user that become subgraphs of the controlling root graph. The knowledge base may further construct the controlling root graph or another controlling graph for different security and compliance standards, or add a meta data/tags to a node that satisfies the compliance standard. This is to suggest the user as the next set of objects, when the user is interested in a specific compliance standard.

2) A prediction, which may include:

Edges in the controlling root graph that will be assigned probabilities/weights (e.g., as based on existing knowledge or trained using data/machine learning). In some embodiments, based on resources that are commonly used weights are assigned based on Global resource usage. That is, resource selected by majority of the users.

Organization or user input, which can be personalized for each user/enterprise by fine-tuning a pre-trained model. In such an embodiment, weights are assigned based on personalized resource usage. That is, a resource selected by a specific user/organization.

Guard rails, which can be real-time predictions during designing, or personalized resource selection at the time the object is placed in a graph. In some embodiments, the guard rails may include Graph Neural Networks (GNN) can generate a probability for recommending a resource at a node/edge position. If a neural network is used, the next resource at an edge during design, could use a deep neural network (DNN), such that the DNN would be trained on past data where the model would predict the next cloud component. The model then may output probabilities for each possible component that might follow the input component and chooses the one with highest probability. That is, with DNNs the input is one component only. In another embodiment, if a neural network is used, the next resource at an edge during design, could use a recurrent neural network (RNN), which can take data of how users add components to their architecture diagrams (e.g., time series data) and train an RNN model to learn to choose the next component based on what the user has chosen so far during the design. That is, with RNNs the input is a series of components added by the model.

Referring back to the guard rails, the guard rails may further include a predicting of the next K (e.g., levels of) resources, where K can be modified by the user. In such an embodiment, related resources for a resource for software connectivity, such as observability monitoring, LogDNA®, etc. are suggested based on a resource type. Similarly, when a source and target are found, in between resources are suggested to user, for instance, in between 2 VPN gateways, a VPN Gateway connection is suggested.

Lastly, the guard rails may further include placement/context/parent information. That is, the assistant, while diagraming is being conducted, also selects a next resource based on the context and/or parent information in which a current graph is placed. For example, a user may want to add a load balancer. If the user is inside a VPC box then a Private DNS/AWS 53 load balancer is suggested to the user. In such a case, if the user is in the initial starting phase such as a request receiving phase, then a Cloud Internet Service (CIS) (e.g., Cloudflare®, CloudFront®, etc.) load balancer is suggested to user as CIS can handle the public internet requests more securely.

3) A recommendation, which may be based on ancestor resources. That is, once a next recommended object is identified and presented to user, when the user selects the recommended object, it is automatically surrounded with ancestor/parent objects For example, a VPN gateway connection is selected by user, the assistant then suggests the next VPN gateway and automatically surrounds the gateway with cloud, region, VPC, subnets, etc.

In some embodiments, once a node is selected by user, the node (e.g., cloud resource) attributes like source, target, parent, and all other attribute information are automatically set/substituted by the assistant tool based on the placement/parent information, in which the selected node is getting attached (e.g., if it's getting attached in between 2 nodes). In some embodiments, the tool has the intelligence to analyze an entire cloud architecture and substitute the node attributes.

Before turning to the FIGS. it is noted that various aspects of the present disclosure are described by narrative text, flowcharts, block diagrams of computer systems and/or block diagrams of the machine logic included in computer program product (CPP) embodiments. With respect to any flowcharts (depending upon the technology involved) the operations can be performed in a different order than what is shown in the flowchart. For example, two operations shown in successive flowchart blocks may be performed in reverse order, as a single integrated step, concurrently, or in a manner at least partially overlapping in time. A computer program product embodiment ("CPP embodiment") is a term used in the present disclosure that may describe any set of one or more storage media (or "mediums") collectively included in a set of one or more storage devices. The storage media may collectively include machine readable code corresponding to instructions and/or data for performing computer operations. A "storage device" may refer to any tangible hardware or device that can retain and store instructions for use by a computer processor. Without limitation, the computer readable storage medium may include an electronic storage medium, a magnetic storage medium, an optical storage medium, an electromagnetic storage medium, a semiconductor storage medium, a mechanical storage medium, and/or any combination thereof. Some known types of storage devices that include mediums referenced herein may include a diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination thereof. A computer-readable storage medium should not be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As understood by those skilled in the art, data is typically moved at some occasional points in time during normal operations of a storage device, such as during access, de-fragmentation or garbage collection, but this does not render the storage device as transitory because the data is not transitory while it is stored.

Referring now to FIG. 1, illustrated is a block diagram describing an embodiment of a computing system 101 within in a computing environment, which may be a simplified example of a computing device (i.e., a physical bare metal system and/or a virtual system) capable of performing the computing operations described herein. Computing system 101 may be representative of the one or more computing systems or devices implemented in accordance with the embodiments of the present disclosure and further described below in detail. It should be appreciated that FIG. 1 provides only an illustration of one implementation of a computing system 101 and does not imply any limitations regarding the environments in which different embodiments may be implemented. In general, the components illustrated in FIG. 1 may be representative of an electronic device, either physical or virtualized, capable of executing machine-readable program instructions.

Embodiments of computing system 101 may take the form of a desktop computer, laptop computer, tablet computer, smart phone, smart watch or other wearable computer, mainframe computer, server, quantum computer, a non-conventional computer system such as an autonomous vehicle or home appliance, or any other form of computer or mobile device now known or to be developed in the future that is capable of running a program 150, accessing a network 102 or querying a database, such as remote database 130. Performance of a computer-implemented method executed by a computing system 101 may be distributed among multiple computers and/or between multiple locations. Computing system 101 may be located as part of a cloud network, even though it is not shown within a cloud in FIGS. 1-2. Moreover, computing system 101 is not required to be in a cloud network except to any extent as may be affirmatively indicated.

Processor set 110 includes one, or more, computer processors of any type now known or to be developed in the future. Processing circuitry 120 may be distributed over multiple packages. For example, multiple, coordinated integrated circuit chips. Processing circuitry 120 may implement multiple processor threads and/or multiple processor cores. Cache 121 may refer to memory that is located on the processor chip package(s) and/or may be used for data or code that can be made available for rapid access by the threads or cores running on processor set 110. Cache 121 memories can be organized into multiple levels depending upon relative proximity to the processing circuitry 120. Alternatively, some, or all of cache 121 of processor set 110 may be located "off chip." In some computing environments, processor set 110 may be designed for working with qubits and performing quantum computing.

Computer readable program instructions can be loaded onto computing system 101 to cause a series of operational steps to be performed by processor set 110 of computing system 101 and thereby implement a computer-implemented method. Execution of the instructions can instantiate the methods specified in flowcharts and/or narrative descriptions of computer-implemented methods included in this specification (collectively referred to as "the inventive methods"). The computer readable program instructions can be stored in various types of computer readable storage media, such as cache 121 and the other storage media discussed herein. The program instructions, and associated data, can be accessed by processor set 110 to control and direct performance of the inventive methods. In computing environments of FIGS. 1-2, at least some of the instructions for performing the inventive methods may be stored in persistent storage 113, volatile memory 112, and/or cache 121, as application(s) 150 comprising one or more running processes, services, programs and installed components thereof. For example, program instructions, processes, services and installed components thereof may include the components and/or sub-components of the system 300 as shown in FIG. 3.

Communication fabric 111 may refer to signal conduction paths that may allow the various components of computing system 101 to communicate with each other. For example, communications fabric 111 can provide for electronic communication among the processor set 110, volatile memory 112, persistent storage 113, peripheral device set 114 and/or network module 115. Communication fabric 111 can be made of switches and/or electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 may refer to any type of volatile memory now known or to be developed in the future, and may be characterized by random access, but this is not required unless affirmatively indicated. Examples include dynamic type random access memory (RAM) or static type RAM. In computing system 101, the volatile memory 112 is located in a single package and can be internal to computing system 101, but, alternatively or additionally, the volatile memory 112 may be distributed over multiple packages and/or located externally with respect to computing system 101. Application 150, along with any program(s), processes, services, and installed components thereof, described herein, may be stored in volatile memory 112 and/or persistent storage 113 for execution and/or access by one or more of the respective processor sets 110 of the computing system 101.

Persistent storage 113 can be any form of non-volatile storage for computers that may be currently known or developed in the future. The non-volatility of this storage means that the stored data may be maintained regardless of whether power is being supplied to computing system 101 and/or directly to persistent storage 113. Persistent storage 113 may be a read only memory (ROM), however, at least a portion of the persistent storage 113 may allow writing of data, deletion of data and/or re-writing of data. Some forms of persistent storage 113 may include magnetic disks, solid-state storage devices, hard drives, flash-based memory, erasable read-only memories (EPROM) and semi-conductor storage devices. Operating system 122 may take several forms, such as various known proprietary operating systems or open-source Portable Operating System Interface type operating systems that employ a kernel.

Peripheral device set 114 includes one or more peripheral devices connected to computing system 101. For example, via an input/output (I/O interface). Data communication connections between the peripheral devices and the other components of computing system 101 may be implemented using various methods. For example, through connections using Bluetooth, Near-Field Communication (NFC), wired connections or cables (such as universal serial bus (USB) type cables), insertion type connections (for example, secure digital (SD) card), connections made though local area communication networks and/or wide area networks such as the internet. In various embodiments, UI device set 123 may include components such as a display screen, speaker, microphone, wearable devices (such as goggles, headsets and smart watches), keyboard, mouse, printer, touchpad, game controllers, and haptic feedback devices. Storage 124 can include external storage, such as an external hard drive, or insertable storage, such as an SD card. Storage 124 may be persistent and/or volatile. In some embodiments, storage 124 may take the form of a quantum computing storage device for storing data in the form of qubits. In some embodiments, networks of computing systems 101 may utilize clustered computing and components acting as a single pool of seamless resources when accessed through a network by one or more computing systems 101. For example, a storage area network (SAN) that is shared by multiple, geographically distributed computer systems 101 or network-attached storage (NAS) applications. IoT sensor set 125 can be made up of sensors that can be used in Internet-of-Things applications. For example, a sensor may be a temperature sensor, motion sensor, infrared sensor or any other type of known sensor type.

Network module 115 may include a collection of computer software, hardware, and/or firmware that allows computing system 101 to communicate with other computer systems through a network 102, such as a LAN or WAN. Network module 115 may include hardware, such as modems or Wi-Fi signal transceivers, software for packetizing and/or de-packetizing data for communication network transmission, and/or web browser software for communicating data over the network. In some embodiments, network control functions and network forwarding functions of network module 115 are performed on the same physical hardware device. In other embodiments (for example, embodiments that utilize software-defined networking (SDN)), the control functions and the forwarding functions of network module 115 can be performed on physically separate devices, such that the control functions manage several different network hardware devices. Computer readable program instructions for performing the inventive methods can typically be downloaded to computing system 101 from an external computer or external storage device through a network adapter card or network interface included in network module 115.

Figure 2:
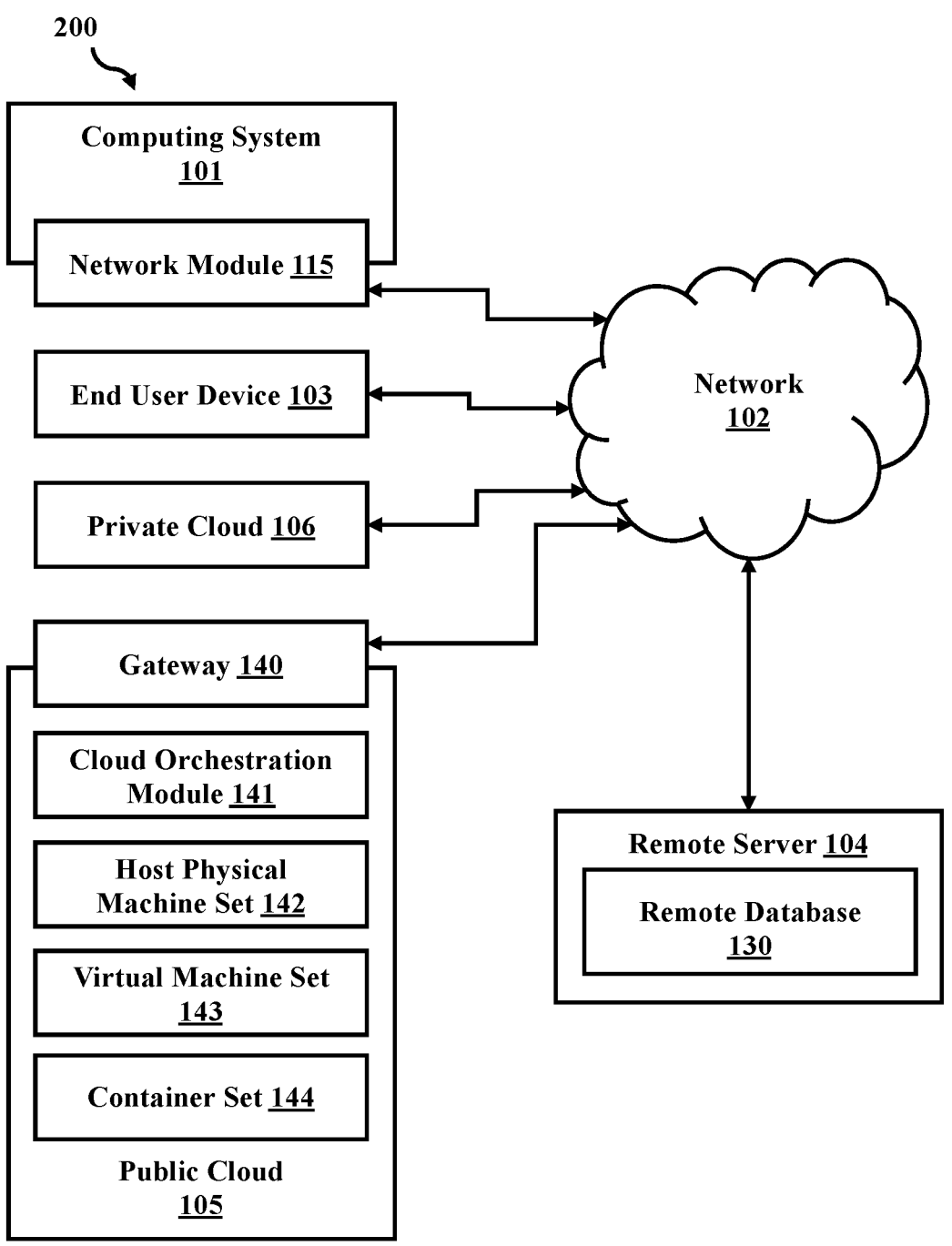
FIG. 2 depicts a block diagram illustrating an extension of the computing system environment of FIG. 1, wherein the computer systems are configured to operate in a network environment (including a cloud environment), and perform methods described herein in accordance with the present disclosure.

Continuing, FIG. 2 depicts a computing environment 200 which may be an extension of the computing environment 100 of FIG. 1, operating as part of a network. In addition to computing system 101, computing environment 200 can include a network 102 such as a wide area network (WAN) (or another type of computer network) connecting computing system 101 to an end user device (EUD) 103, remote server 104, public cloud 105, and/or private cloud 106. In this embodiment, computing system 101 includes processor set 110 (including processing circuitry 120 and cache 121), communication fabric 111, volatile memory 112, persistent storage 113 (including operating system 122 and program(s) 150, as identified above), peripheral device set 114 (including user interface (UI), device set 123, storage 124, Internet of Things (IoT) sensor set 125), and network module 115. Remote server 104 includes remote database 130. Public cloud 105 includes gateway 140, cloud orchestration module 141, host physical machine set 142, virtual machine set 143, and/or container set 144.

Network 102 may be comprised of wired or wireless connections. For example, connections may be comprised of computer hardware such as copper transmission cables, optical transmission fibers, wireless transmission, routers, firewalls, switches, gateway computers and/or edge servers. Network 102 may be described as any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. Other types of networks that can be used to interconnect the various computer systems 101, end user devices 103, remote servers 104, private cloud 106 and/or public cloud 105 may include Wireless Local Area Networks (WLANs), home area network (HAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 101.

End user device 103 can include any computer device that can be used and/or controlled by an end user (for example, a customer of an enterprise that operates computing system 101) and may take any of the forms discussed above in connection with computing system 101. EUD 103 may receive helpful and useful data from the operations of computing system 101. For example, in a hypothetical case where computing system 101 is designed to provide a recommendation to an end user, this recommendation may be communicated from network module 115 of computing system 101 through WAN 102 to EUD 103. In this example, EUD 103 can display, or otherwise present, the recommendation to an end user. In some embodiments, EUD 103 may be a client device, such as thin client, thick client, mobile computing device such as a smart phone, mainframe computer, desktop computer and so on.

Remote server 104 may be any computing systems that serves at least some data and/or functionality to computing system 101. Remote server 104 may be controlled and used by the same entity that operates computing system 101. Remote server 104 represents the machine(s) that collect and store helpful and useful data for use by other computers, such as computing system 101. For example, in a hypothetical case where computing system 101 is designed and programmed to provide a recommendation based on historical data, the historical data may be provided to computing system 101 from remote database 130 of remote server 104.

Public cloud 105 may be any computing systems available for use by multiple entities that provide on-demand availability of computer system resources and/or other computer capabilities including data storage (cloud storage) and computing power, without direct active management by the user. The direct and active management of the computing resources of public cloud 105 can be performed by the computer hardware and/or software of cloud orchestration module 141. The computing resources provided by public cloud 105 can be implemented by virtual computing environments that run on various computers making up the computers of host physical machine set 142, and/or the universe of physical computers in and/or available to public cloud 105. The virtual computing environments (VCEs) may take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through network 102.

VCEs can be stored as "images." A new active instance of the VCE can be instantiated from the image. Two types of VCEs may include virtual machines and containers. A container is a VCE that uses operating-system-level virtualization, in which the kernel allows the existence of multiple isolated user-space instances, called containers. These isolated user-space instances may behave as physical computers from the point of view of programs 150 running in them. An application 150 running on an operating system 122 can utilize all resources of that computer, such as connected devices, files and folders, network shares, CPU power, and quantifiable hardware capabilities. Applications 150 running inside a container of container set 144 may only use the contents of the container and devices assigned to the container, a feature which may be referred to as containerization.

Private cloud 106 may be similar to public cloud 105, except that the computing resources may only be available for use by a single enterprise. While private cloud 106 is depicted as being in communication with network 102 (such as the Internet), in other embodiments a private cloud 106 may be disconnected from the internet entirely and only accessible through a local/private network. A hybrid cloud may refer to a composition of multiple clouds of different types (for example, private, community or public cloud types), and the plurality of clouds may be implemented or operated by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 may be both part of a larger hybrid cloud environment.

Figure 3A:
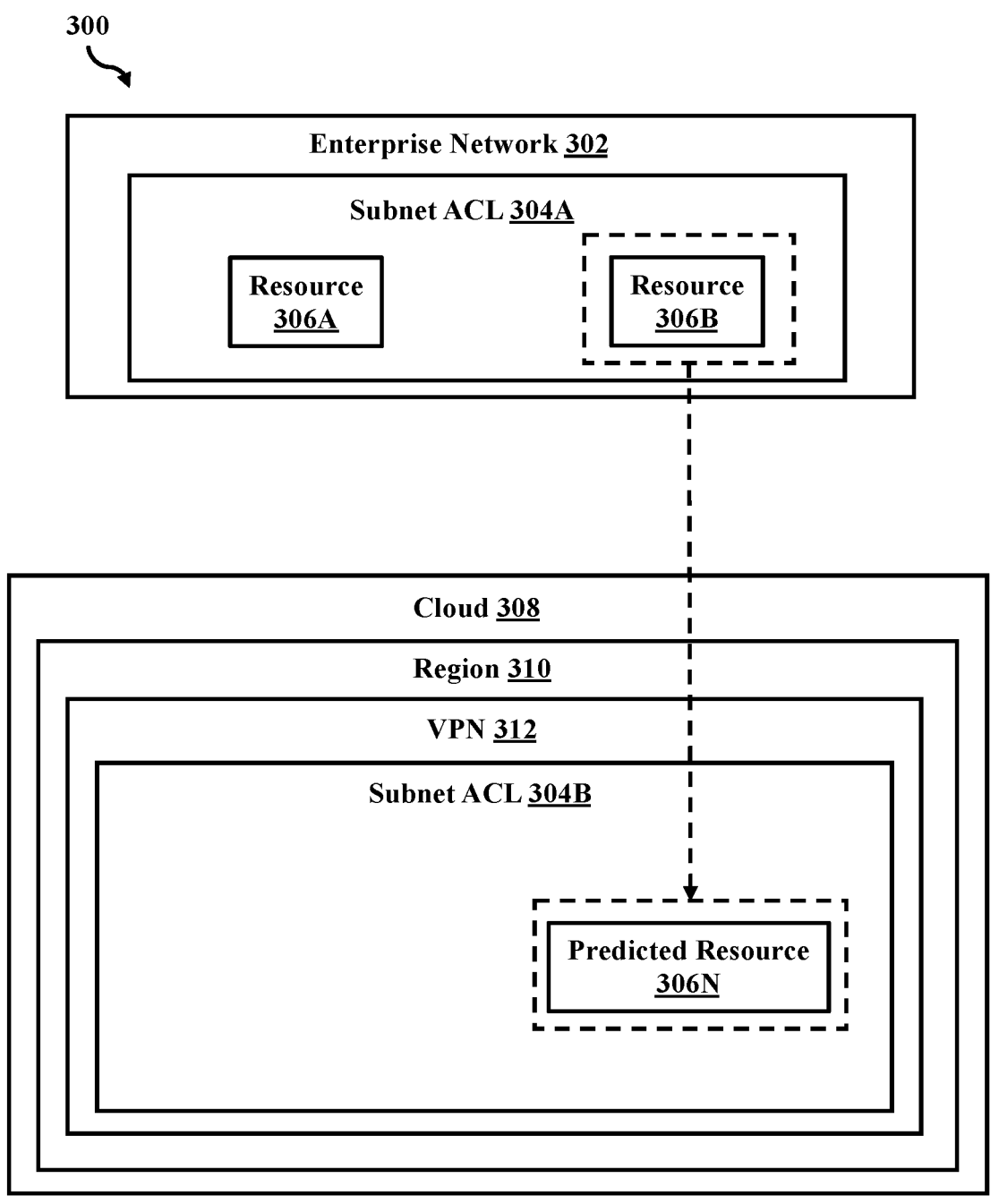
FIG. 3A illustrates a block diagram of an example resource distribution user interface, in accordance with aspects of the present disclosure.

Referring now to FIG. 3A, illustrated a block diagram of an example resource distribution user interface 300, in accordance with aspects of the present disclosure.

As depicted, the resource distribution user interface 300 includes an enterprise network 302 with a subnet access control list (ACL) 304A, which includes a resource 306A and a resource 306B. A cloud 308 with a region 310 that includes a virtual private network (VPN) 312, which includes a subnet ACL 304B that includes a predicted resource 306N. In some embodiments, the predicted resource 306N may be the same or substantially the same as the resource 306B. In some embodiments, a user interacts with the resource distribution user interface 300, which may include a design assistant.

As an example of what is depicted in FIG. 3A, a user may be designing an architecture for the cloud 308 and the resource distribution user interface 300, acting as a design assistant may recommend the predicted resource 306N as based on the architecture of the enterprise network 302 acting as an ancestor/historical architecture reference.

Figure 3B:
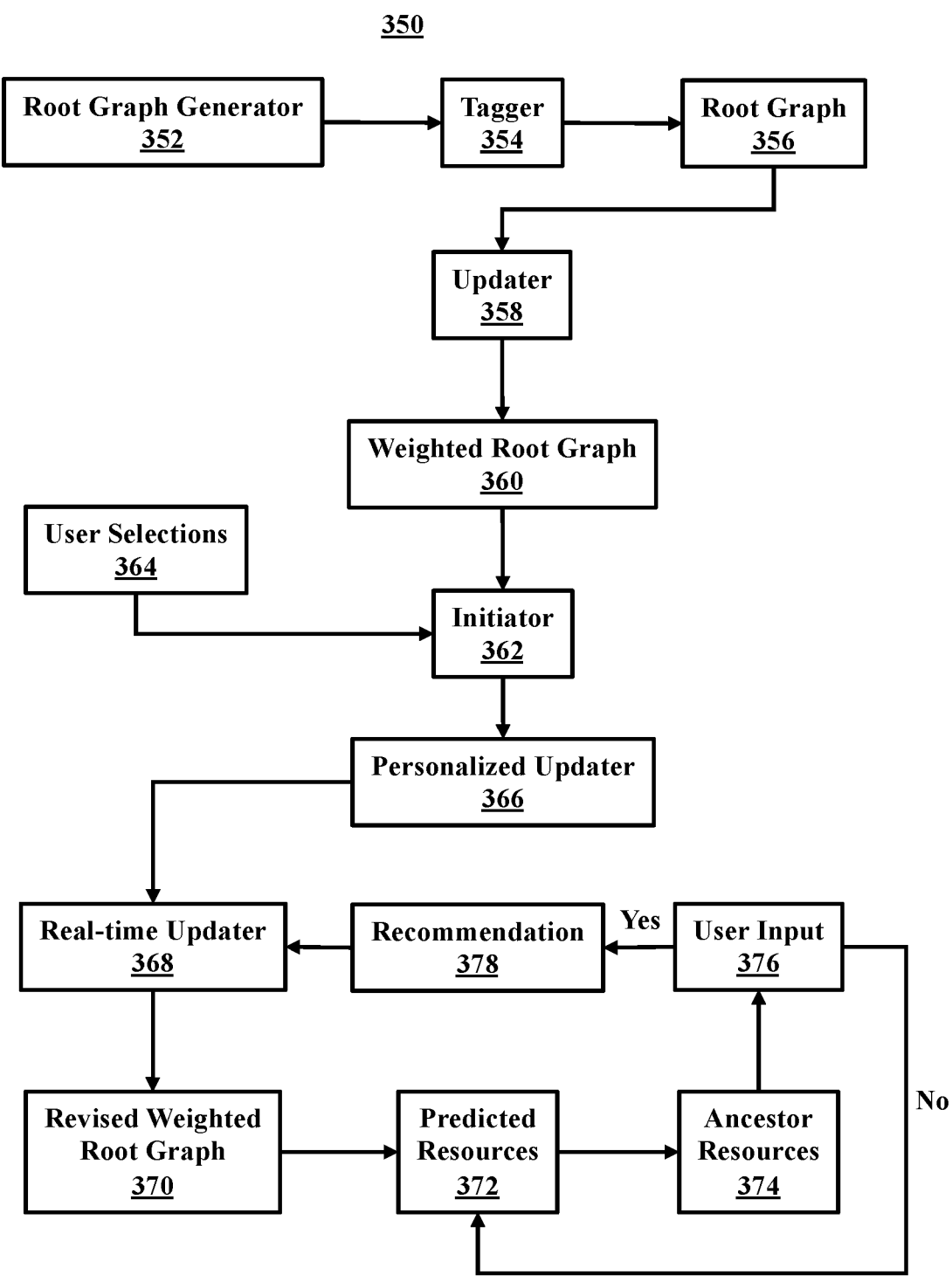
FIG. 3B illustrates a block diagram of an example design assistant system, in accordance with aspects of the present disclosure.

Turning now to FIG. 3B, illustrated is a block diagram of an example design assistant system 350, in accordance with aspects of the present disclosure. In some embodiments, the design assistant system 350 may incorporate, or utilize, the resource distribution user interface 300 of FIG. 3A.

As depicted, the design assistant system 350 includes a root graph generator 352, a tagger 354, a root graph 356, an updater 358, a weighted root graph 360, an initiator 362, a user selection 364, a personalized updater 366, a real-time updater 368, a revised weighted root graph 370, predicted resources 372, an ancestor 374, a user input 376, and a recommendation 378.

In some embodiments, the design assistant system 350 utilizes the root graph generator 352 to build a root graph for different IaC and cloud providers. The design assistant system 350 then utilizes the tagger 354, which tags resources and edges based on different compliance standards (e.g., if a prior resource is X, then a subsequent resource must be Y, etc. The design assistant system 350 then generates the root graph 356. The design assistant system 350 then utilizes the updater 358, which has a global update phase that uses global usage metrics to assign weights/probabilities to the edges. The updater 538 is then used by the design assistant system 350 to generate the weighted root graph 360.

In some embodiments, the design assistant system 350 then utilizes the initiator 362, which starts the design assistance process. In some embodiments, the initiator 362 is provided the user selections 364, which may include a user selected prediction level (e.g., number of resources to be predicted for a project/design), a user selected IaC, a user selected compliance standard, a user selected cloud provider, etc. In some embodiments, the design assistant system 350 utilizes the initiator 362 with the user selections 364 to input the selections into the personalized updater 366. The personalized updater 366 then provides a personalized update phase, where an update to the current weights based on the user selections 364, and personalized user usage history data is incorporated analyzed.

In some embodiments, the design assistant system 350 then utilizes the real-time updater 368 to run a real-time update phase where the analysis from the personalized updater 366 is incorporated into the weighted root graph 360 to generate the revised weighted root graph 370. It is noted that the revised weighed root graph 370 may be generated in real time.

In some embodiments, the design assistant system 350 then utilizes the predicted resources 372, as based on the user prediction levels of the user selections 364 to determine from the ancestor resources 374, which resources should be recommended for the user's design in real time. In some embodiments, the design assistant system 350 then searches the ancestor resources 374 to predict then next resources to be added to the user's design. In some embodiments, the ancestor resources 374 are shown to the user, but are not placed in the user's design/project. In some embodiments, the design assistant system 350 asks the user for their input about the ancestor resources and is provided the user input 376. If the user input 376 affirms the ancestor resources 374, the design assistant system 350 provides the recommendation 378 directly to the user's design in real time and the ancestor resources 374, or resource, is incorporated into the user's design. If the user input 376 does not affirm the ancestor resources 374, the design assistant system 350 reverts back to the predicted resources 372 and reevaluates the user prediction levels and then proceeds to find other ancestor resources 374 and provide a further recommendation 378.

Figure 4:
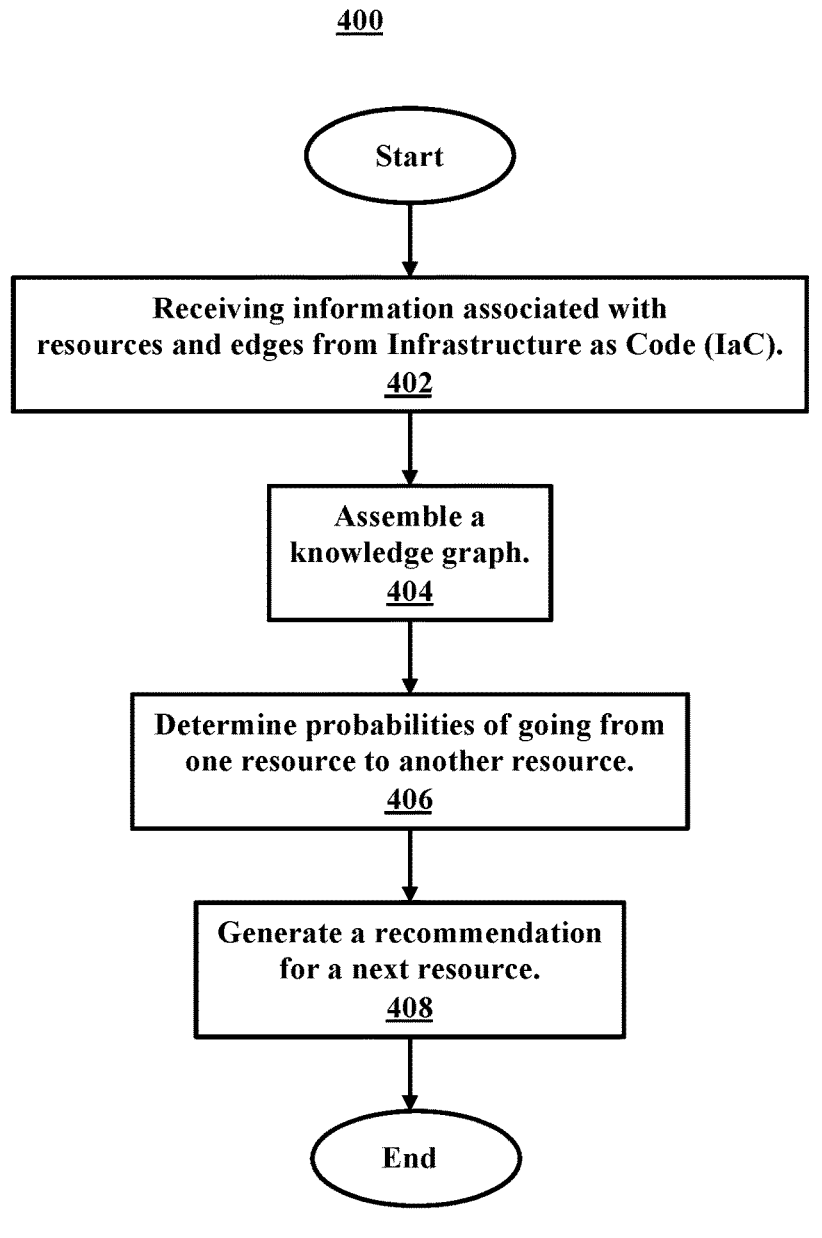
FIG. 4 illustrates a flowchart of an example method for a design assistant for cloud architectures, in accordance with aspects of the present disclosure.

Referring now to FIG. 4, illustrated a flowchart of an example method 400 for a design assistant for cloud architectures, in accordance with aspects of the present disclosure. In some embodiments, the method 400 may be performed by a processor, such as a processor of the design assistant system 350, or it may be performed by the design assistant system 350 itself.

In some embodiments, the method 400 begins at operation 402, the processor receives information associated with resources and edges from Infrastructure as Code (IaC). In some embodiments, the method 400 proceeds to operation 404, where the processor assembles a knowledge graph. The knowledge graph may be a controlling root graph for infrastructure code that contains the resources and edges from the IaC.

In some embodiments, the method 400 proceeds to operation 406, where the processor determines, based on global usage statistics of the resources, probabilities of going from one resource to another resource. Going from one resource to another resource may be an edge. In some embodiments, the method 400 proceeds to operation 408, where the processor generates a recommendation for a next response. In some embodiments, the method 400 may end.

In some embodiments, discussed below, there are one or more operations of the method 400 not depicted for the sake of brevity and which are discussed throughout this disclosure. Accordingly, in some embodiments, determining probabilities of going from one resource to another resource may include the processor analyzing real-time data usage statistics as resources are used, and updating the probability for each resource in real-time.

In some embodiments, determining probabilities of going from one resource to another resource may include the processor weighting the probabilities based on one or more factors. The one or more factors may be associated with a likelihood of a resource being used. In some embodiments, weighting the probabilities may include the processor forecasting usage statistics for the IaC. In some embodiments, weighting the probabilities may further include the processor accessing usage statistics of a user, predicting user usage of the resource based on the usage statistics of the user, and generating a user specific weight.

In some embodiments, generating the recommendation may include the processor analyzing ancestor resources as based on the global usage statistics, analyzing the placement of the resources, and analyzing resource attribute information. In some embodiments, the processor may further update, based on the analyzing of the ancestor resources, placement of the resources, and the resource attribute information, the recommendation in real time.

It is noted that the descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer system for a design assistant for cloud architectures, the computer system comprising:

one or more processors, one or more computer-readable memories and one or more computer-readable storage media;

program instructions, stored on at least one of the one or more storage media for execution by at least one of the one or more processors via at least one of the one or more memories, to receive information associated with resources and edges from Infrastructure as Code (IaC);

program instructions, stored on at least one of the one or more storage media for execution by at least one of the one or more processors via at least one of the one or more memories, to assemble a knowledge graph, wherein the knowledge graph is a controlling root graph for infrastructure code that contains the resources and edges from the IaC;

program instructions, stored on at least one of the one or more storage media for execution by at least one of the one or more processors via at least one of the one or more memories, to determine, based on global usage statistics of the resources, probabilities of going from one resource to another resource, wherein going from one resource to another resource is an edge, determining probabilities of going from one resource to another including weighting the probabilities based on one or more factors, wherein the one or more factors are associated with a likelihood of a resource being used; and program instructions, stored on at least one of the one or more storage media for execution by at least one of the one or more processors via at least one of the one or more memories, to generate a recommendation for a next resource.

2. The computer system of claim 1, wherein determining probabilities of going from one resource to another resource includes:

analyzing real-time data usage statistics as resources are used; and updating the probability for each resource in real-time.

3. The computer system of claim 1, wherein weighting the probabilities includes:

forecasting usage statistics for the IaC.

4. The computer system of claim 3, wherein weighting the probabilities further includes:

accessing usage statistics of a user;

predicting user usage of the resource based on the usage statistics of the user; and generating a user specific weight.

5. The computer system of claim 4, wherein generating the recommendation includes:

analyzing ancestor resources as based on the global usage statistics;

analyzing the placement of the resources; and analyzing resource attribute information.

6. The computer system of claim 5, further comprising:

program instructions, stored on at least one of the one or more storage media for execution by at least one of the one or more processors via at least one of the one or more memories, to update, based on the analyzing of the ancestor resources, placement of the resources, and the resource attribute information, the recommendation in real time.

7. A computer-implemented method for a design assistant for cloud architectures, the method comprising:

receiving, by a processor, information associated with resources and edges from Infrastructure as Code (IaC);

assembling a knowledge graph, wherein the knowledge graph is a controlling root graph for infrastructure code that contains the resources and edges from the IaC;

determining, based on global usage statistics of the resources, probabilities of going from one resource to another resource, wherein going from one resource to another resource is an edge, determining probabilities of going from one resource to another resource including analyzing in real-time data usage statistics as resources are used and updating the probability for each resource; and generating a recommendation for a next resource.

8. The method of claim 7, wherein determining probabilities of going from one resource to another resource includes:

weighting the probabilities based on one or more factors, wherein the one or more factors are associated with a likelihood of a resource being used.

9. The method of claim 8, wherein weighting the probabilities includes:

forecasting usage statistics for the IaC.

10. The method of claim 9, wherein weighting the probabilities further includes:

accessing usage statistics of a user;

predicting user usage of the resource based on the usage statistics of the user; and generating a user specific weight.

11. The method of claim 7, wherein generating the recommendation includes:

analyzing ancestor resources as based on the global usage statistics;

analyzing the placement of the resources; and analyzing resource attribute information.

12. The method of claim 11, further comprising:

updating, based on the analyzing of the ancestor resources, placement of the resources, and the resource attribute information, the recommendation in real time.

13. A computer program product for a design assistant for cloud architectures, the computer system comprising:

one or more computer-readable storage media;

program instructions, stored on at least one of the one or more storage media, to receive information associated with resources and edges from Infrastructure as Code (IaC);

program instructions, stored on at least one of the one or more storage media, to assemble a knowledge graph, wherein the knowledge graph is a controlling root graph for infrastructure code that contains the resources and edges from the IaC;

program instructions, stored on at least one of the one or more storage media, to determine based on global usage statistics of the resources, probabilities of going from one resource to another resource, wherein going from one resource to another resource is an edge, determining probabilities including analyzing real-time data usage statistics as resources are used, and updating the probability for each resource in real-time; and program instructions, stored on at least one of the one or more storage media, to generate a recommendation for a next resource.

14. The computer program product of claim 13, wherein determining probabilities of going from one resource to another resource includes:

weighting the probabilities based on one or more factors, wherein the one or more factors are associated with a likelihood of a resource being used.

15. The computer program product of claim 14, wherein weighting the probabilities includes:

forecasting usage statistics for the IaC.

16. The computer program product of claim 15, wherein weighting the probabilities further includes:

accessing usage statistics of a user;

predicting user usage of the resource based on the usage statistics of the user; and generating a user specific weight.

17. The computer program product of claim 16, wherein generating the recommendation includes:

analyzing ancestor resources as based on the global usage statistics;

analyzing the placement of the resources; and analyzing resource attribute information.

* * * * *